O. O. KRUH.
HIGH VOLTAGE MERCURY ARC RECTIFIER.
APPLICATION FILED SEPT. 20, 1907.
993,843.
Patented May 30, 1911.
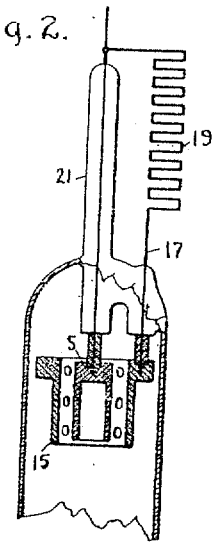
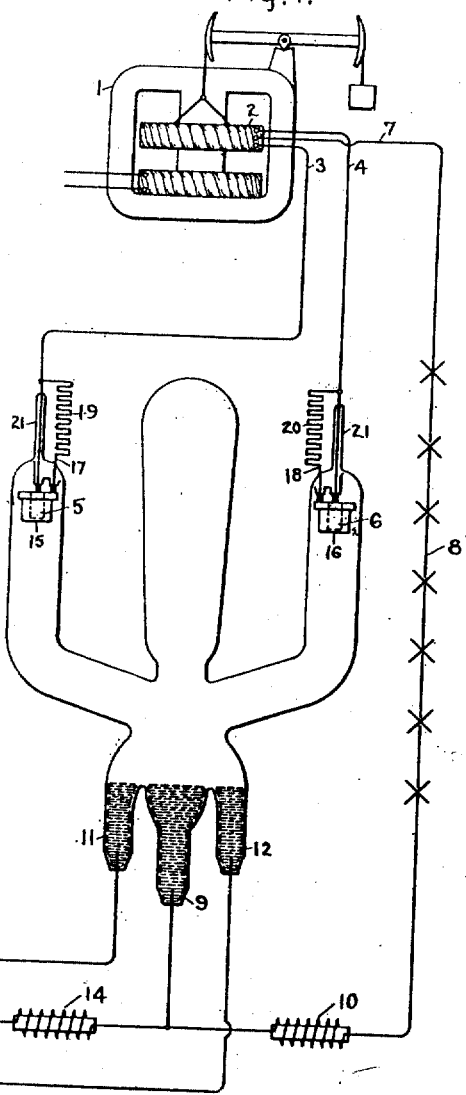
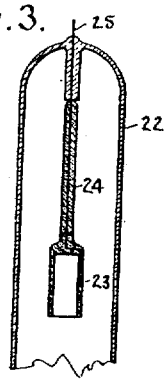
Witnesses:
Irving E. Steers.
J. Ellis Glen
Inventor
Osias O. Kruh,
by Albert G. Davis
Atty.

UNITED STATES PATENT OFFICE.

OSIAS O. KRUH, OF SCHENECTADY, NEW YORK, ASSIGNOR TO GENERAL ELECTRIC COMPANY, A CORPORATION OF NEW YORK.

HIGH-VOLTAGE MERCURY-ARC RECTIFIER.

993,843.  Specification of Letters Patent.  Patented May 30, 1911.

Application filed September 20, 1907. Serial No. 393,816.

*To all whom it may concern:*

Be it known that I, OSIAS O. KRUH, a subject of the Emperor of Austria-Hungary, residing at Schenectady, in the county of Schenectady and State of New York, have invented certain new and useful Improvements in High-Voltage Mercury-Arc Rectifiers, of which the following is a specification.

In the operation of mercury arc rectifiers, particularly of that type used for rectifying high voltage constant alternating current for supplying a series distribution system containing arc lamps, it has been observed, under some conditions of operation, that the voltage of the alternating current necessary to produce a given direct current voltage in the rectified circuit increases and that this increase is sometimes progressive. That is to say, it may happen that the constant current transformer usually used in connection with such a system is called upon to give a higher and higher voltage in order to maintain the same voltage and current in the direct-current circuit. A point is finally reached where the full voltage capacity of the transformer is called for. If the phenomenon to which this trouble is due manifests itself to a still further degree then, the alternating current supply voltage having reached its limit, the current in the rectified circuit decreases, the rectifier goes out and the system ceases to operate. Even before this stage is reached, however, it may also happen that as the full load condition of the constant current supply transformer is approached without a corresponding increase in the load on the rectified circuit, the system may become subject to surges or similar fluctuations which may operate to put the rectifier out or possibly to cause arcing from anode to anode to occur and thus ultimately destroy the rectifier and so disable the system. The phenomenon above described whereby the ratio between the direct-current voltage and the alternating-current voltage of the rectifier system is changed in such a way as to indicate a decrease of the direct current voltage relative to the alternating supply voltage has come to be known in the art as "fading".

It is one of the objects of my present invention to provide means for overcoming this trouble known as "fading" and to that end I have provided certain improvements which insure the proper ratio between the alternating current supply voltage of the rectifier and the voltage of the rectified current.

The features of novelty which characterize my invention are pointed out with particularity in the appended claims. The invention itself however, will be better understood by reference to the following description taken in connection with the accompanying drawings, in which—

Figure 1 represents diagrammatically a system embodying my invention; Fig. 2 a detail of Fig. 1 but on a larger scale; and Fig. 3 a modification.

The arrangement which I have found effective for preventing "fading" embodies certain modifications in the construction of the usual rectifier tube. Before proceeding, however, to a description of this modified construction I will first describe briefly a system in which my invention is found to be useful.

Referring now to Fig. 1, I have herein shown an arc lighting circuit fed with constant rectified current derived from a constant current transformer through the interposition of a high voltage mercury arc rectifier. The constant current transformer is indicated at 1 and serves to supply from its secondary circuit a current which is automatically maintained constant in value irrespective of the load. Transformers of this type are well known in the art and thus no detailed description of the transformer is necessary. From the terminals of the secondary 2 of this transformer mains 3 and 4 extend to and are connected with the positive electrodes or anodes 5 and 6 of a mercury arc rectifier tube. From an intermediate point, or the electrical center of the secondary 2, a main 7 extends and is connected to one end of the load circuit 8 of direct current arc lamps or the like, the other end of which circuit is connected to the cathode 9 of the rectifier. Somewhere in the circuit 7, 8 between the secondary 2 and the cathode 9 an inductance coil may be located as at 10, for smoothing out current fluctuations and to secure stability of operation. The usual starting anodes 11 and 12 for the rectifier may be provided and these may be connected in the ordinary way with an exciting transformer 13, the secondary of which has its terminals connected respectively, to the electrodes 11 and 12 and its intermediate point or electrical center through an inductance coil 14 to the cathode 9. The rectifier is started in the usual way by shaking the tube to produce starting arcs between the cathode and the starting anodes. These starting arcs form a sort of igniting means for setting the main arcs in the rectifier tube into operation in a manner well understood and requiring no special description.

I will now pass to a description of the particular improvements which I have embodied in the rectifier tube to prevent "fading" and similar disturbances. It will be observed that about each of the electrodes 5 and 6 I have provided electrically conducting envelops or electrodes 15 and 16, respectively. Like the electrodes 5 and 6, these envelops may be formed of artificial graphite or some other suitable refractory conducting material. They are connected to suitable leading-in conductors 17, 18 respectively, and by the latter are connected through interposed resistances 19, 20 to the external leads of the electrodes 5 and 6. A view of this construction on a larger scale is shown in Fig. 2 in which the same reference numerals are used as are employed with respect to the left-hand electrode 5, Fig. 1.

In order to explain the operation of the anode shields or envelops for preventing "fading" it is necessary first to set forth briefly the cause to which "fading" seems to be due and the probable or possible reasons therefor. In all alternating current rectifier tubes where a plurality of anodes are connected to the alternating current supply systems, arcs flow from the anodes to the cathode during those periods when the supply voltage to the primary anode is positive and cease flowing during the negative wave of the supply voltage. Thus, as the supply voltage on one anode passes through zero, the voltage on another anode commences to rise and when the latter has reached a sufficient magnitude, the arc starts to the latter anode and subsequently goes out at the preceding anode. In a "fading" rectifier it has been found that the arc in starting at a new anode does not commence at a moderate value of voltage on the rising wave of impressed voltage, but only at larger and larger succeeding voltages on the impressed wave. A considerable area of the voltage wave thus becomes useless for impressing voltage on the rectified circuit and hence the voltage and current in the direct current are reduced. In order to therefore keep up the value of the current in the load circuit or rectified circuit, the alternating current transformer must so regulate as to increase the supply voltage on the rectifier.

The reasons why the rectifier arcs in a "fading" rectifier start at a later point on the wave of impressed voltage than would be the case in a normal rectifier are difficult to determine with any certainty. (Perhaps the state of the vacuum in the tube has considerable to do with it.) On the other hand, experimental evidence seems to indicate that "fading" may in some way be due to the presence of static charges of negative potential on the inside of the rectifier tube adjacent to the anodes. Such charges, if present, would explain the delay in starting of rectifiers at each alternation, from the fact that, in starting, the first passage of current, as distinguished from the flow after the current has actually commenced, is probably carried mostly by negative charges emanating from the negative electrode or cathode. These charges would be opposed by the negative charges in the vicinity of the anodes and thus would require a greater impressed voltage to initiate the first passage of current. If this be the explanation of "fading", which I consider to be probable, though I do not bind myself to its accuracy, then the effectiveness of the anode envelops as I have described, is easily explained. Thus referring to Figs. 1 and 2 it will be observed that the anode envelop or shield, say 15, is interposed between the anode 5 and the rectifier tube so as to receive any static charges which may emanate either from the electrode itself or from the adjacent wall of the tube, and conduct them away by means of the leading-in conductor 17 and resistance 19. The resistance 19 being connected to the lead for the anode 5 therefore serves to equalize the potential about the anodes 5 and to conduct away any charges, especially of negative potential. A connection such as is afforded by resistance 19 has been found desirable because it has been found in practice that in the absence of such a connection extremely high differences of potential may exist between the envelop 15 and the anode 5 and so high in fact as to cause sparks to jump between the leading-in conductors of the electrodes and shield respectively. This high voltage is probably due to some oscillating effects and the resistance such as 19 serves to damp out the oscillations and reduce the magnitude of the voltage. In order further to guard against sparking between the leading-in conductors I consider it desirable even with the use of the resistance 19, to have the leading-in conductors well insulated from each other, as for example, by surrounding one of them with glass as at 21 and to have the other separated from the region of the first by a considerable distance.

With the arrangement described I have found that the ratio between the alternating current supply voltage and the direct current voltage of the system remains normal and that the operation of the system is rendered steady and free from those objectionable features which appear when the so-called "fading" occurs.

I have set forth what I believe to be the probable explanation of the beneficial operation of my invention, but as before stated, I do not wish to be confined to any particular theory, since my invention may be practiced and its beneficial effects obtained regardless of any theory.

In Fig. 3 I have represented a somewhat different arrangement of the anodes, which also I have found to be very beneficial in preventing "fading". In this case the whole rectifier is not shown, but merely one arm 22 thereof, the rectifier as a whole being understood to be of substantially the shape shown in Fig. 1. In Fig. 3 the anode consists of a hollow body portion 23 having a long, integral shank 24. The leading-in wire 25 passes down through the tube through the usual seal and extends through substantially the whole length of the shank 24, and, as is usual in electrode fastening, has its lower end screwed into the material of the electrode. With such an electrode, it is found that the arc to this electrode practically fills the whole space in the rectifier tube and surrounds not only the enlarged portion 23 of the electrode, but also the shank or stem 24. It is probable that by this arrangement the arc filling the space between the tube and the shank is instrumental in conducting away through the shank any negative charges which may accumulate on the adjacent walls of the rectifier tube. In any event, however, I have found that an electrode of this character is effective for the purpose of preventing the bad effects of "fading", and preserving a normal ratio of transformation, so to speak, between the alternating and the direct voltages of the rectifier system.

What I claim as new and desire to secure by Letters Patent of the United States, is,

1. In an alternating current vapor electric apparatus in which the current flows unidirectionally, the combination of a cathode, a plurality of anodes, and means within the apparatus for preventing abnormal lag of the starting of the arcs from the respective anodes to the cathode with respect to the phase of the impressed electromotive forces.

2. In a mercury arc rectifier, electrical means within the envelop of the rectifier for preserving the normal ratio of transformation.

3. In a mercury arc rectifier, the combination of a cathode, a plurality of anodes, and means for conducting away static charges from the immediate neighborhood of the anodes.

4. In an alternating current mercury arc device, an envelop, an anode, a shield in said envelop located about said anode, and means for maintaining said anode and said shield at substantially the same potential.

5. A mercury arc rectifier tube, an anode, and a shield or envelop in said tube and located about said anode and a potential equalizing connection between said anode and said shield.

6. In a mercury arc rectifier, an evacuated envelop, an anode therein, and a shield or envelop located within said evacuated envelop and a resistive path for dissipating negative charges on said shield.

7. In a mercury arc rectifier, an evacuated envelop, an anode therein, and a shield or envelop about said anode and located in said evacuated envelop and electrically connected to the anode through a non-inductive resistance.

8. In a mercury arc rectifier tube, an anode, a shield or envelop in said tube statically charged by said anode and means for conducting away said charge.

9. In a mercury arc rectifier, the combination of a cathode, a plurality of anodes and means within the rectifier for removing static charges which delay the starting of arcs from the anodes to the cathode with respect to the phase of the impressed electromotive force.

In witness whereof, I have hereunto set my hand this 18th day of September, 1907.

OSIAS O. KRUH.

Witnesses:
BENJAMIN B. HULL,
HELEN ORFORD.

---

Copies of this patent may be obtained for five cents each, by addressing the "Commissioner of Patents. Washington, D. C."